United States Patent
Moore

(10) Patent No.: US 6,564,305 B1
(45) Date of Patent: May 13, 2003

(54) COMPRESSING MEMORY MANAGEMENT IN A DEVICE

(75) Inventor: Keith E. Moore, Santa Clara, CA (US)

(73) Assignee: Hewlett-Packard Development Company LP, Houston, TX (US)

(*) Notice: Subject to any disclaimer, the term of this patent is extended or adjusted under 35 U.S.C. 154(b) by 170 days.

(21) Appl. No.: 09/665,870

(22) Filed: Sep. 20, 2000

(51) Int. Cl.[7] .............................................. G06F 12/00
(52) U.S. Cl. ...................... 711/154; 711/118; 711/206; 707/101; 358/1.9; 358/1.15
(58) Field of Search ................................ 711/105, 165, 711/202, 206, 154, 118; 707/101; 358/1.1, 1.9, 1.15

(56) References Cited

U.S. PATENT DOCUMENTS

| | | | | |
|---|---|---|---|---|
| 5,237,460 A | * | 8/1993 | Miller et al. .................. 360/48 |
| 5,357,614 A | * | 10/1994 | Pattisam et al. .............. 710/68 |
| 5,359,723 A | * | 10/1994 | Mathews et al. ........... 711/122 |
| 5,696,926 A | * | 12/1997 | Culbert et al. .............. 711/105 |
| 5,696,927 A | * | 12/1997 | MacDonald et al. .......... 710/68 |
| 5,751,996 A | * | 5/1998 | Glew et al. .................. 711/145 |
| 5,761,536 A | * | 6/1998 | Franaszek .................... 341/55 |
| 5,812,817 A | * | 9/1998 | Hovis et al. .................. 710/68 |
| 5,864,859 A | * | 1/1999 | Franaszek ...................... 707/1 |
| 5,955,691 A | * | 9/1999 | Suzuki et al. ................. 84/604 |
| 6,128,094 A | * | 10/2000 | Smith ........................ 358/1.15 |
| 6,173,381 B1 | * | 1/2001 | Dye ............................ 345/555 |
| 6,175,896 B1 | * | 1/2001 | Bui ............................. 709/247 |
| 6,281,985 B1 | * | 8/2001 | Sawano ....................... 358/1.9 |
| 6,353,871 B1 | * | 3/2002 | Benveniste et al. ......... 711/118 |
| 6,515,759 B1 | * | 2/2003 | Smith ........................ 358/1.15 |
| 2001/0013939 A1 | * | 8/2001 | Weaver et al. ............... 358/1.9 |

* cited by examiner

Primary Examiner—Hiep T. Nguyen

(57) ABSTRACT

A device with compressing memory management for effectively increasing the size of its physical memory while insulating applications from the underlying memory compression. A device according to the present techniques includes a memory that holds a set of information in a compressed domain and a processor that accesses the information in an uncompressed domain. The device includes mechanisms for transferring the information between the compressed and uncompressed domains in a manner that is transparent to software elements executing in the device.

20 Claims, 5 Drawing Sheets

COMPRESSING MEMORY MANAGEMENT IN A DEVICE

BACKGROUND OF THE INVENTION

1. Field of Invention

The present invention pertains to the field of devices having processing resources. More particularly, this invention relates to memory management in devices having processing resources.

2. Art Background

A wide variety of devices including printers, copiers, telephones, home entertainment devices, etc., commonly include processing resources. Such a device may be referred to as an embedded system because an application is embedded with the processing resources rather than loaded off of a replaceable media as in a computer system. The processing resources in such a device may be relatively limited due to packaging constraints and/or cost constraints.

The processing resources in such a device usually include memory. It is usually desirable to implement such a device with relatively large amounts of memory. Typically, larger amounts of memory enables the implementation of more complex functionality in the device. In addition, larger amounts of memory usually increase the speed of the device in performing its functions. Unfortunately, larger amounts of memory usually increase the cost of such a device.

Some prior devices attempt to increase the effective size of memory by compressing the information stored in the memory. The compression in prior devices is usually performed by the application programs that execute in the devices. Unfortunately, the implementation of compression at the application level usually greatly increases the cost of application development and may decrease stability of application execution.

SUMMARY OF THE INVENTION

A device is disclosed with compressing memory management for effectively increasing the size of its physical memory while insulating applications from the underlying memory compression. A device according to the present techniques includes a memory that holds a set of information in a compressed domain and a processor that accesses the information in an uncompressed domain. The device includes mechanisms for transferring the information between the compressed and uncompressed domains in a manner that is transparent to applications and other software elements executing in the device.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
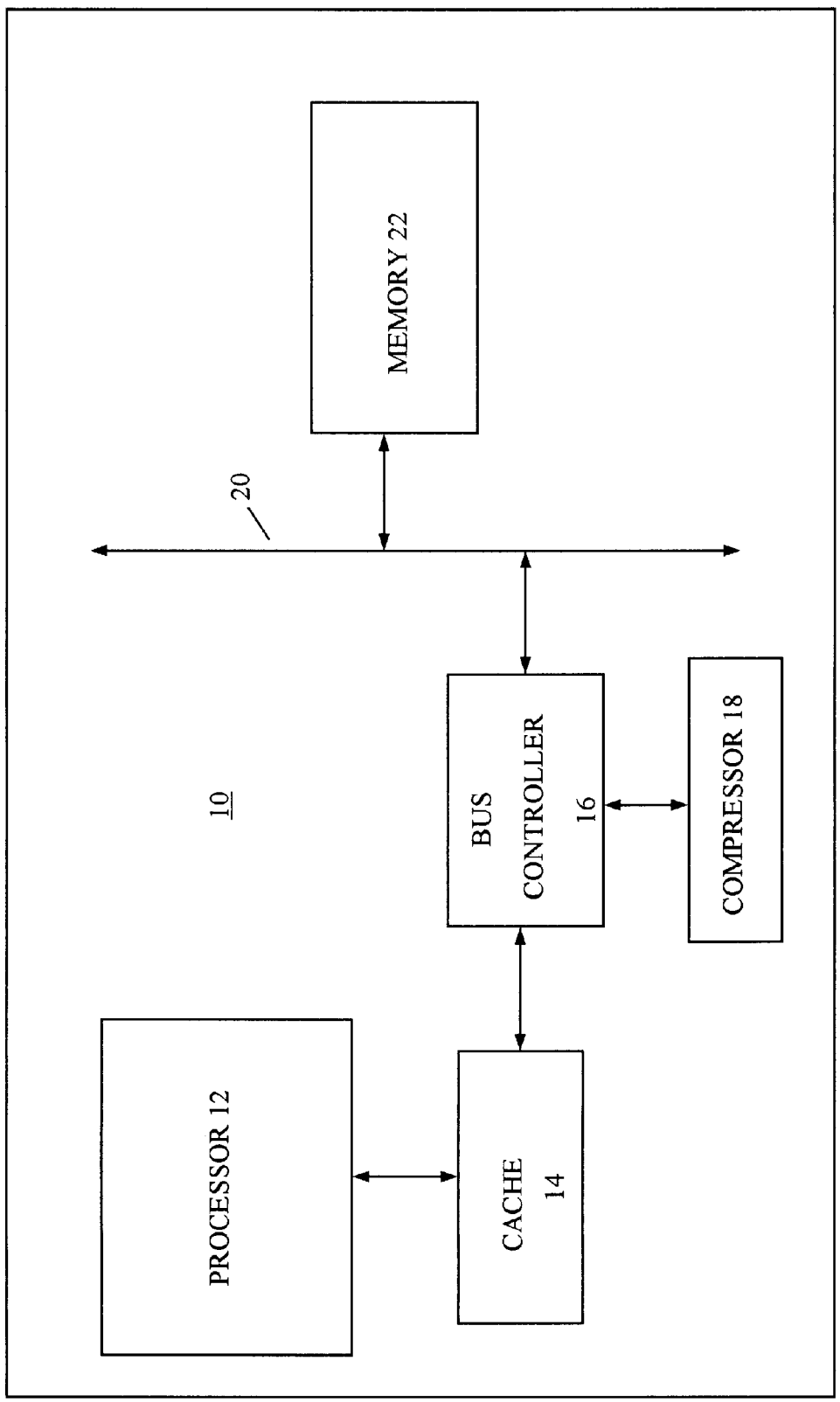
FIG. 1 shows one embodiment of a device according to the present teachings.

FIG. 1 shows a device 10 according to the present teachings. The device 10 includes a processor 12, a cache 14, and a memory 22 that stores information for the processor 12. The device 10 also includes a bus controller 16 that enables access to the memory 22 via a bus 20.

The information in the memory 22 is stored in compressed form. The information in the cache 14 is stored in uncompressed form. The information stored in the memory 22 and transferred via the bus 20 may be viewed as being in a compressed domain while the information stored in the cache 14 and used by the processor 12 may be viewed as being in an uncompressed domain.

The device 10 includes a compressor 18 that compresses information as it is transferred from the uncompressed to the compressed domain and that decompresses information as it is transferred from the compressed domain to the decompressed domain.

In one embodiment, the compressor 18 performs compression and decompression according to well-known LZW compression techniques. In other embodiments, any one of a variety of other suitable compression techniques may be used.

The memory 22 may be a persistent memory such as a read-only memory or a flash memory, etc. Alternatively, the memory 22 may be a random access memory. The information stored in the memory 22 may be the firmware, operating system, and/or applications code, etc., associated with the device-specific functions of the device 10. The information stored in the memory 22 may be data generated and/or consumed during performance of the device-specific functions of the device 10.

The cache 14 is organized into sets of data commonly referred to as cache blocks or cache lines. The cache 14 may be an instruction cache for the processor 12 or a data cache for the processor 12 or a combined instruction/data cache for the processor 12. The cache 14 may be implemented on the same integrated circuit chip that contains the processor 12. Alternatively, the processor 12 and the cache 14 may be implemented on different integrated circuit chips. In some embodiments, the cache 14 may be replaced or augmented by a relatively small random access memory.

The following focuses on an example embodiment in which the cache 14 is a data cache. This example embodiment is nevertheless applicable to embodiments in which the cache 14 is an instruction cache or a combined instruction/data cache.

The processor 12 initiates a read from memory operation by providing memory address to the cache 14. If the data corresponding to the memory address is held in the cache 14 then that data is read from the cache 14 and is provided directly back to the processor 12 to complete the read from memory operation. If the data corresponding to the memory address is not held in the cache 14 then a read request is issued to the bus controller 16.

In response to the read request, the bus controller 16 reads the compressed form of the data corresponding to the memory address from the memory 22 and the compressor 18 decompresses it. The decompressed data is provided to the processor 12 to complete the read from memory operation. The retrieved data may be stored into the cache 14.

The processor 12 initiates a write to memory operation by providing a new set of data and a memory address to the cache 14. If the old data corresponding to the memory address is held in the cache 14 then the new data from the processor 12 is written directly into the cache 14 over the old data to complete the write to memory operation. If the old data corresponding to the memory address is not held in the cache 14 then a cache fill request is issued to the bus controller 16.

In response to the cache fill request, the bus controller 16 reads the compressed form of the old data corresponding to the memory address from the memory 22 and the compressor 18 decompresses it. The decompressed data is written into the cache 14 so that is indexed by the memory address provided by the processor 12. The new data from the processor 12 is then written into the cache 14 over the old data to complete the write to memory operation.

The cache 14 may implement any conceivable cache block replacement policy. A cache block that is evicted from the cache 14 is written back to the memory 22 if the memory 22 is a writeable memory and is discarded if the memory 22 is a read-only memory. When a cache block is written back to the memory 22 it is compressed by the compressor 18 before being written into the memory 22.

In some embodiments, the compressor 18 is implemented in hardware using, for example, an application-specific integrated circuit. In other embodiments, the compressor 18 may be implemented in firmware which is executed by the processor 12.

The device 10 may be an embedded system. Some embedded systems include a hardware compressor which is used for other purposes. Printers, for example, commonly include hardware compressors for reducing the bandwidth on bus connections to print head mechanisms. In such embedded systems, the hardware compressor may also be used to provide the compression/decompression as described herein.

In some embodiments, the memory 22 may include portions that hold compressed information and portions that hold uncompressed information. In such embodiments, the device 10 includes mechanisms for tracking which portions are compressed and invoke the functions of the compressor 18 accordingly.

In one embodiment, the device 10 implements a page manager that performs page address translations between the compressed and uncompressed domains. The page manager may be implemented in the bus controller 16 or in another element of the device 10. The page manager may be invoked by a page fault mechanism of the processor 12. This embodiment offers the advantage that the compression ratio is usually very good for pages as opposed to cache lines. This is because most compression mechanisms produce better results with more redundancy and the larger the sample the better the redundancy as a general rule.

These mechanisms for transferring information between the compressed and uncompressed domains function in a manner that is transparent to software elements such as application programs that are implemented in the device 10. Application programs, for example, execute without regard to the underlying address translations performed by the page manager and the compression performed on the hardware path between the compressed and uncompressed domains.

Figure 2:
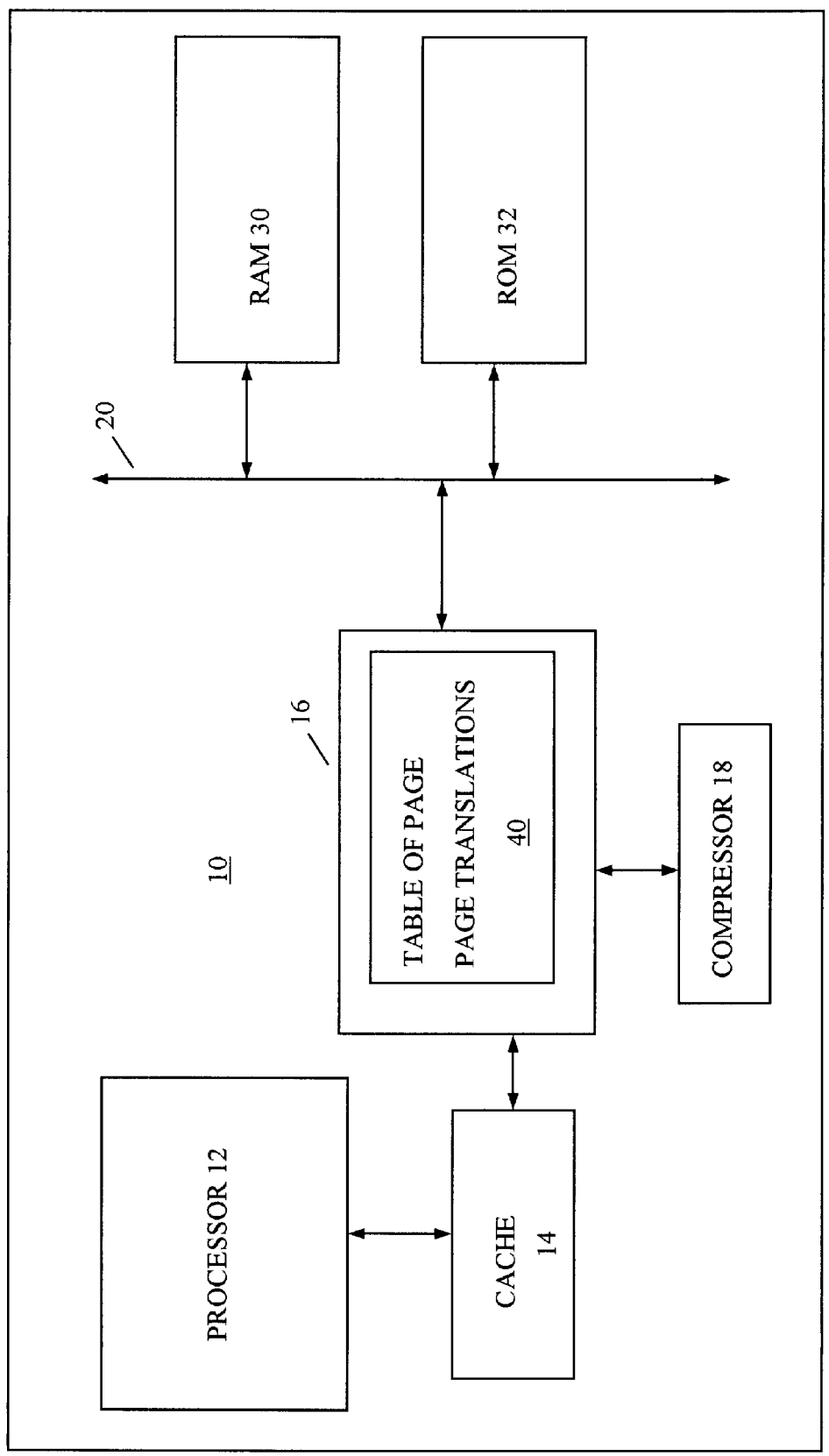
FIG. 2 show another embodiment of a device according to the present teachings which includes a random-access memory and a read-only memory.

FIG. 2 show an embodiment of the device 10 which includes a random-access memory (RAM) 30 and a read-only memory (ROM) 32. Information may be stored in compressed form in the RAM 30 or the ROM 32 or in both. The bus controller 16 implements a page manager that maintains a table 140 of page translations between the compressed and uncompressed domains.

Table 1 shows an example of the information which may be included in the table 140 in one embodiment.

TABLE 1

| Page Address | Page Offset | Size (compressed) | In Memory |
|---|---|---|---|
| 0x4000000 | 0x1000000 | 534 bytes | RAM |
| 0x4001000 | 0x1000216 | 278 bytes | RAM |
| 0x4002000 | 0x100032C | 1045 bytes | RAM |
| 0x4003000 | 0x1000741 | 2034 bytes | RAM |

In this example, each page is 4096 bytes but in other embodiments may be any size. The page address of 0x4000000 in the uncompressed domain maps to offset 0x1000000 in the compressed domain in the RAM 30, the page address of 0x4001000 in the uncompressed domain maps to offset 0x1000216 in the compressed domain in the RAM 30, etc.

For example, the page manager reads 534 bytes from page offset 0x1000000 in the compressed domain of the RAM 30 and the obtained 534 bytes are decompressed into a 4096 byte page having a page address of 0x4000000. The bus controller 16 may be used by the page manager to perform the transfer and the compressor 18 used to perform the decompression. The decompressed page may be stored in memory such as an uncompressed area of the RAM 30 or in some other memory. A desired cache line may then be obtained from the decompressed page using an appropriate offset address generated by the processor 12 during a read/write operation.

This page swapping between compressed and uncompressed domains may function in conjunction with a virtual paging mechanism. For example, processor 12 may have one or more translation look-aside buffers for virtual address/physical address translations.

The page manager uses the "In Memory" RAM and ROM indicators in the table 140 to determine whether to perform a write back of a page when data is evicted from the cache 14. The page manager only performs a write back if the data was obtained from RAM which in this example is the RAM 30. The write back of a page or cache line to the compressed domain may take up more or less space than was originally reserved in the compressed domain for that page or line. The page manager or some other element may maintain a linked lists or tables that hold next page boundaries that may be used to find written back pages. The bus controller 16 may be used by the page manager to perform the write back and the compressor 18 used to perform the compression during the write back.

In some embodiments, multiple pages may be compressed together such that the page address is a page range. The page manager may maintain a list of free pages so that unused pages may be grouped together.

Figure 3:
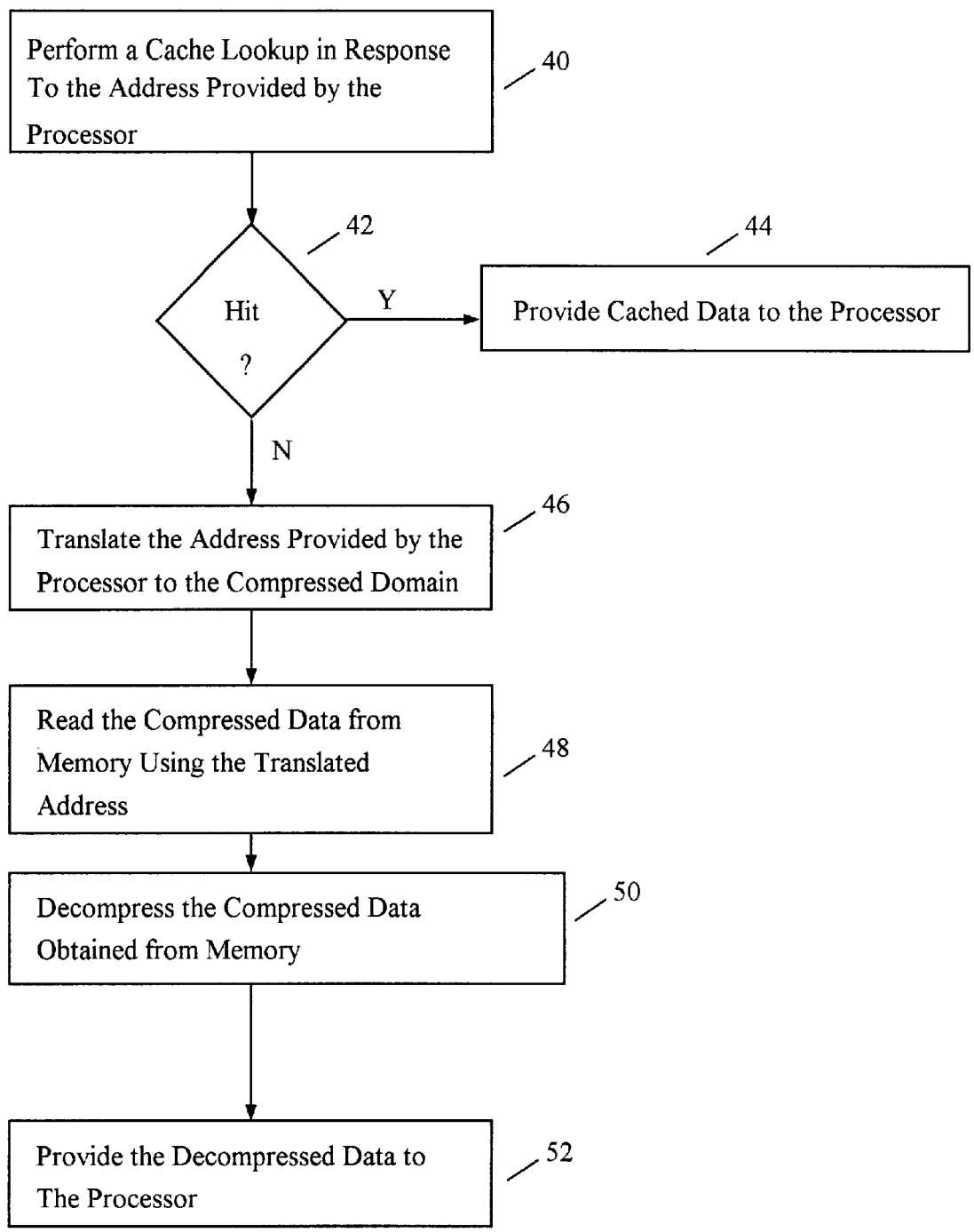
FIG. 3 shows the basic steps involved in performing a read from memory operation in one embodiment.

FIG. 3 shows the basic steps involved in performing a read from memory operation in one embodiment. At step 40, a cache lookup to the cache 14 is performed using an address generated by the processor 12 during the read from memory operation.

If a hit to the cache 14 occurs at step 42, then the cached data (or instruction code) is provided back to the processor 12 at step 44. Otherwise, the address generated by the processor 12 during the read from memory operation is translated to the compressed domain at step 46. The translation may be performed using the information maintained in the table 140 and may be performed by the bus controller 16, by a separate page manager, or by code which is executed by the processor 12, to name a few examples.

At step 48, the compressed data (or instruction code) is read from memory, for example, the RAM 30 or the ROM 32, using the translated address obtained at step 46. At step 50, the compressor 18 decompresses the data read at step 48.

At step 52, the decompressed data (or instruction code) from step 50 is provided to the processor 12 in response to complete its read from memory operation. The decompressed data may be stored into the cache 14 and this may result in an eviction and write-back of cached data to memory as appropriate.

In embodiments that do not include the cache 14, steps 40–44 may be eliminated.

Figure 4:
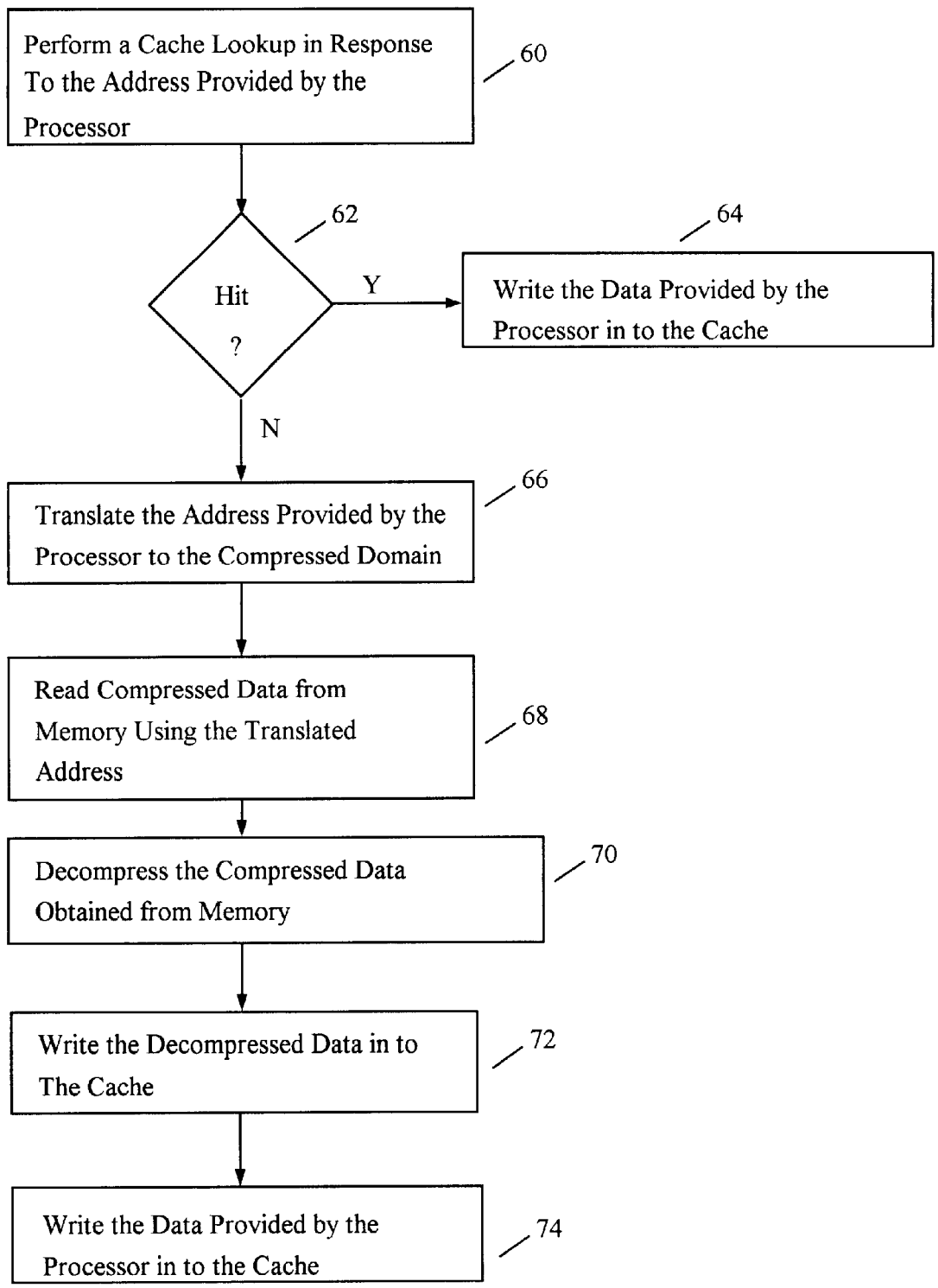
FIG. 4 shows the basic steps involved in performing a write to memory operation in one embodiment.

FIG. 4 shows the basic steps involved in performing a write to memory operation in one embodiment. At step 60, a cache lookup to the cache 14 is performed using an address generated by the processor 12 during the write to memory operation.

If a hit to the cache 14 occurs at step 62, then a set of new data provided the processor 12 with the write to memory operation is written into the cache 14 over the old data at step 64. Otherwise, the address generated by the processor 12 during the write to memory operation is translated to the compressed domain at step 66. The translation may be performed in a manner similar to translations performed during read to memory operations.

At step 68, the compressed data from the translated address obtained at step 66 is read from memory. At step 70, the compressor 18 decompresses the data read from memory at step 68. At step 72, the decompressed data from step 70 is written into the cache 14. This may result in an eviction of some other cache block from the cache 14 and a write-back of the evicted cache block to memory as appropriate.

At step 74, the new data provided by the processor 12 with the write to memory operation is written into the cache 14 over the old data obtained from memory, thereby completing the write to memory operation.

In embodiments that do not include the cache 14, the address generated by the processor 12 during the write to memory operation is translated to the compressed domain and the new data provided by the processor 12 with the write to memory operation is compressed and written to the memory at the translated address, thereby completing the write to memory operation.

Figure 5:
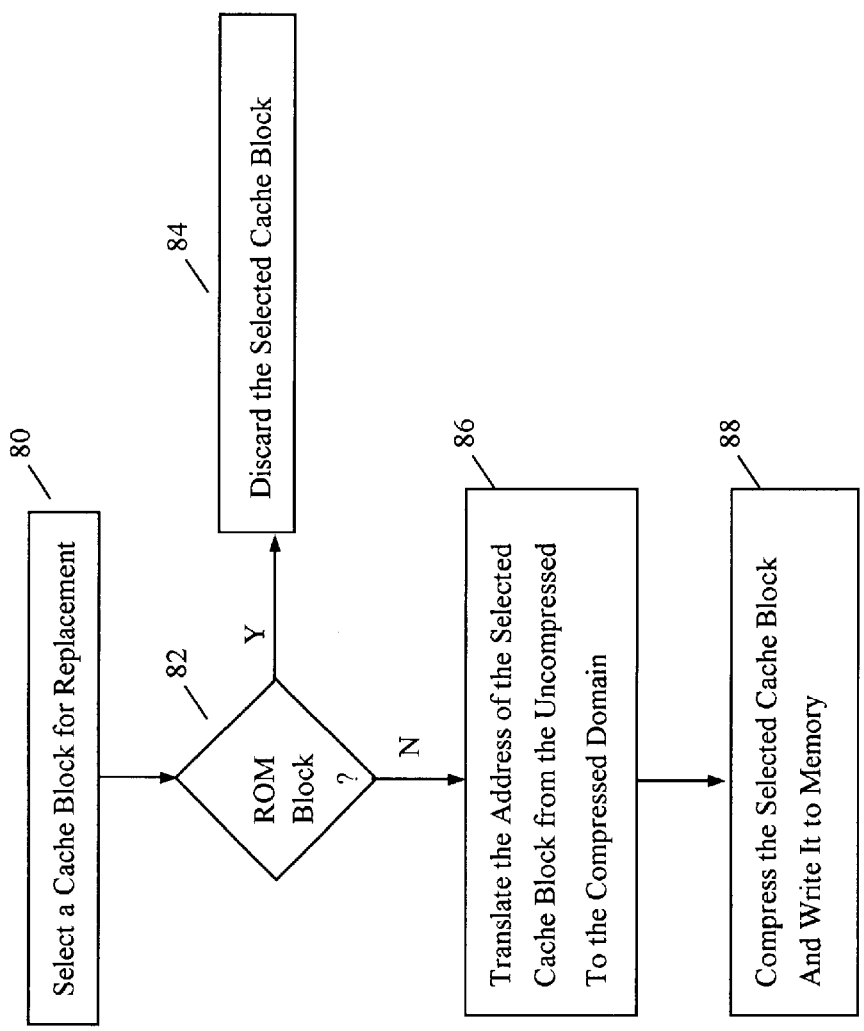
FIG. 5 shows the basic steps involved in evicting a cache block from a cache in one embodiment.

FIG. 5 shows the basic steps involved in evicting a cache block from the cache 14 in one embodiment. At step 80, a cache block is selected for replacement. The method used to select a cache block for replacement may be any method. For example, the least recently used cache block may be selected at step 80. As another example, a cache block which is not part of a set of cache blocks held in the cache 14 that have sequential page addresses may be selected at step 80.

At step 82, it is determined whether the cache block selected at step 80 was originally obtained from a read-only memory such as the ROM 32. If the selected cache block was obtained from ROM, then it is discarded at step 84. Otherwise, the address of the selected cache block in the uncompressed domain is translated to the compressed domain at step 86. The translation may be performed using the information in the table 140.

At step 88, the selected cache block is compressed by the compressor 18 and is then written back to memory at the uncompressed address determined at step 86.

The bus 20 is a communication path that in some embodiments may include multiple buses or communication links that are interconnected with the appropriate communication hardware.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An embedded system, comprising:
   memory coupled to a communication path, the memory for holding a set of information in a compressed domain;
   processor coupled to the communication path, the processor accessing the information in an uncompressed domain;
   controller that transfers the information between the compressed and uncompressed domains by compressing and decompressing the information as the information is transferred between the memory and the processor such that the compression and decompression is transparent to one or more application programs executing in the embedded system.

2. The embedded system of claim 1, wherein the controller provides the processor with access to the information in the uncompressed domain by writing the information into the memory in an uncompressed form.

3. The embedded system of claim 1, wherein the controller provides the processor with access to the information in the uncompressed domain by writing the information into another memory in an uncompressed form.

4. The embedded system of claim 1, wherein the controller provides the processor with access to the information in the, uncompressed domain by providing the information in an uncompressed form to a cache associated with the processor.

5. The embedded system of claim 4, wherein the controller maintains an indication of whether the memory is a read-only memory for use in determining whether to perform a write-back to the memory when the information is evicted from the cache.

6. The embedded system of claim 1, further comprising a table that associates an offset in the compressed domain to an offset in the uncompressed domain.

7. The embedded system of claim 1, further comprising a page manager that performs page address translations between the compressed and uncompressed domains.

8. An embedded system having a hardware compressor, comprising:
   memory coupled to a communication path, the memory for holding a set of information in a compressed domain;
   processor coupled to the communication path, the processor accessing the information in an uncompressed domain;
   controller that transfers the information between the compressed and uncompressed domains by using the hardware compressor to compress and decompress the information as the information is transferred between the memory and the processor such that the compression and decompression is transparent to one or more application programs executing in the embedded system.

9. The embedded system of claim 8, wherein the hardware compressor is also used for compressing other information.

10. The embedded system of claim 8, wherein the hardware compressor is also used for reducing the bandwidth on a bus connection to a print head mechanism.

11. The embedded system of claim 8, wherein the controller provides the processor with access to the information in the uncompressed domain by providing the information in an uncompressed form to a cache associated with the processor.

12. The embedded system of claim 11, wherein the controller maintains an indication of whether the memory is a read-only memory for use in determining whether to perform a write-back to the memory when the information is evicted from the cache.

13. The embedded system of claim 8, further comprising a table that associates an offset in the compressed domain to an offset in the uncompressed domain.

14. The embedded system of claim 8, further comprising a page manager that performs page address translations between the compressed and uncompressed domains.

15. A printer, comprising:

hardware compressor;

memory coupled to a communication path, the memory for holding a set of information in a compressed domain;

processor coupled to the communication path, the processor accessing the information in an uncompressed domain;

controller that transfers the information between the compressed and uncompressed domains by using the hardware compressor to compress and decompress the information as the information is transferred between the memory and the processor such that the compression and decompression is transparent to one or more application programs executing in the embedded system.

16. The printer of claim 15, wherein the hardware compressor is also used for reducing the bandwidth on a bus connection to a print head mechanism.

17. The printer of claim 15, wherein the controller provides the processor with access to the information in the uncompressed domain by providing the information in an uncompressed form to a cache associated with the processor.

18. The printer of claim 17, wherein the controller maintains an indication of whether the memory is a read-only memory for use in determining whether to perform a write-back to the memory when the information is evicted from the cache.

19. The printer of claim 15, further comprising a table that associates an offset in the compressed domain to an offset in the uncompressed domain.

20. The printer of claim 15, further comprising a page manager that performs page address translations between the compressed and uncompressed domains.

\* \* \* \* \*